Dec. 14, 1954 W. KASTEN ET AL 2,696,915
FILTER
Filed Feb. 27, 1952
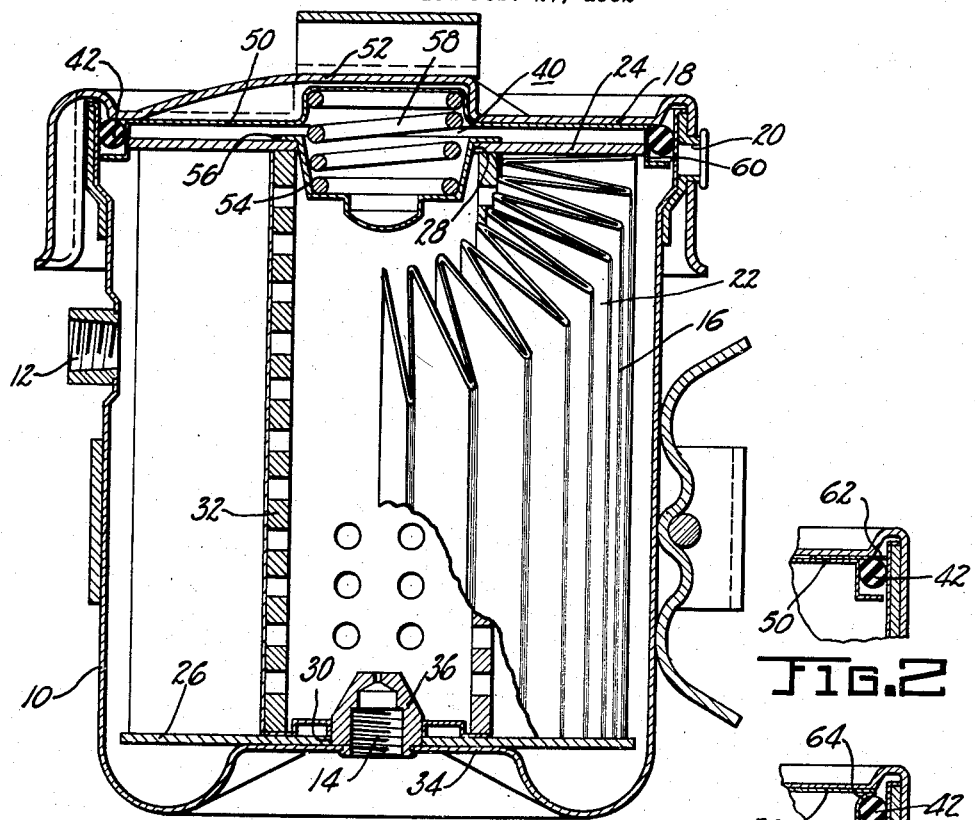
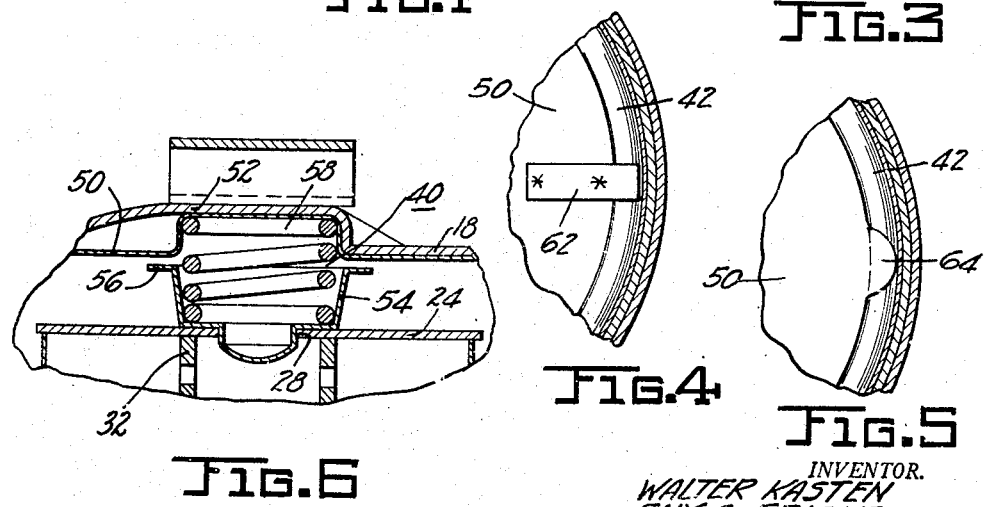
INVENTOR.
WALTER KASTEN
GUY C. FRICKE
BY
M. A. Hobbs
ATTORNEY

United States Patent Office 2,696,915
Patented Dec. 14, 1954

2,696,915
FILTER

Walter Kasten and Guy C. Fricke, Detroit, Mich., assignors to Bendix Aviation Corporation, South Bend, Ind., a corporation of Delaware Application February 27, 1952, Serial No. 273,636

5 Claims. (Cl. 210—164)

This invention relates to filters and more particularly to a fluid filtering device having a replaceable element.

One of the principal objects of the present invention is to provide a filtering device having a replaceable element which can readily be assembled in operative position and thereafter easily removed in servicing the device.

Another object of the invention is to provide a fixture for use in the aforesaid type of filtering device, which holds the filter element and sealing gasket thereof in operative position and which can easily be removed from the device to permit replacement of the filter element.

Another object is to provide, in a fluid filtering device having an independent filter element, an element retaining fixture which is adapted for use with various sized elements.

Still another object is to provide a relatively simple automotive oil filter which can readily be installed on an engine and which can thereafter easily be serviced.

Further objects and advantages of the present invention will become apparent from the following description and accompanying drawing wherein:

Figure 1 is a vertical cross-sectional view of a filtering device embodying my invention;

Figures 2 and 3 are fragmentary cross-sectional views of the filtering device of Figure 1, showing two forms of the gasket retaining means;

Figures 4 and 5 are fragmentary views of the device of Figure 1, showing further details of the gasket retaining means; and Figure 6 is a fragmentary view of my filter element retaining fixture shown as used in combination with a small size element.

Referring more specifically to the drawing, numeral 10 designates a filter container, 12 a fluid inlet passage, 14 a fluid outlet passage, 16 a filter element mounted over said outlet passage, 18 a cover for container 10, held thereon by any suitable means, as for example a bayonet-type retaining means shown in part at numeral 20. The filter element, which is only one of several types suitable for use in the present filtering device, consists of vertically pleated side walls 22 of resinous impregnated paper cemented at the top and bottom to annular plates 24 and 26, respectively, which rigidly hold said element in a cylindrical shape and, except for holes 28 and 30 in plates 24 and 26 respectively, fully seal the two ends of the filter element. A perforated cylinder 32 gives internal support to the pleated side walls and permits the fluid to pass freely from said walls to the fluid outlet passage at the bottom. The element seats on the raised central portion 34 of the container bottom with port 30 in fluid-tight relationship with an outlet stem 36 and is held in operative position by my retaining fixture 40, to be more fully described hereinafter.

The filter cover is sealed to the container by an annular resilient gasket 42, such as an O-ring, of rubber or rubberlike material adapted to fit snugly in the upper end of the container and to form a seal with the inside wall of the container. With the type of resilient gasket shown in the drawing, relative movement between the container wall and the gasket is preferably prevented in that such movement causes the gasket to gather at various places and adhere to the wall at some places and pull away from the wall at other places, thus tending to prevent the formation of an effective seal.

The fixture 40 for holding the filter element in place consists of a disc-shaped member 50 having an upwardly extending recess 52, a cup-shaped member 54 extending into hole 28 of plate 24 and having an annular flange 56 for engaging the plate about hole 28, and a coil spring 58 seated and firmly secured at one end in said recess and at the other end in said cup-shaped member. The spring reacting between member 50 and member 54 urges the filter element to its seat about outlet passage 14 and causes member 54 to seat firmly on plate 24 and seal hole 28 so that, for fluid to reach the hollow interior of the element from inlet 12, it must pass through the pleated side walls 22 of the filter element.

The periphery of disc-shaped member 50 is provided with a flange 60 to retain gasket 42 in place in the container and to facilitate removal of the gasket when the filter element is being replaced. Since the gasket is assembled in place along with fixture 40, which is not rotated in the assembly operation, the gasket is not subjected to any rotational movement which would tend to cause the gasket to gather, as previously explained. To prevent the gasket from becoming displaced after the fixture is removed from the container, a plurality of fingers 62 of Figures 2 and 4, or dimples 64 of Figures 3 and 5 extending radially from member 50 may be provided above the gasket. In the arrangement shown in Figure 1, which does not include the fingers or dimples, the seal is formed between the gasket and the container side walls and the inside surface of the cover. In the arrangement of Figures 2 and 3, the seal is principally formed between the container wall and the vertical portion of flange 60.

When the element is to be replaced, the cover is removed and one edge of plate 50 is pressed downwardly causing the opposite edge to rise above the edge of the container. The fixture can then easily be grasped and removed from the container, leaving the center hole 28 of the element open and readily accessible for the service operator to use in lifting the element from the container. After the new element has been inserted in the container, the fixture with the gasket is placed on the element without any rotational movement which might adversely affect the seal between the gasket and container side walls. The cover which is then replaced holds the fixture and element in a fixed operating position.

Various changes may be made in the construction of the foregoing filtering device and sealing means without departing from the scope of our invention.

We claim:

1. In a filtering device comprising a cylindrical container having a fluid inlet passage and a fluid outlet passage, and a filter element having a top plate with a hole therein operably positioned between said inlet and outlet passages: sealing means including a cup-shaped member extending into said hole and having a flange for engaging said plate, a disc-shaped member having an annular flange forming a groove adjacent the inside wall of said container, a coil spring disposed between said members secured in said cup-shaped member, and an annular gasket seated in said groove forming a seal between said flange and the inside wall of said container.

2. A filtering device as set forth in claim 1 in which said disc-shaped member is provided with an upwardly extending recess in axial alignment with said cup-shaped member serving as a seat for one end of said coil spring.

3. A filtering device as set forth in claim 2 having a cover for said container arranged to exert an axial force against said disc-shaped member.

4. In a filtering device comprising a cylindrical container having a fluid inlet passage and a fluid outlet passage, and a cylindrical filtering element having a top plate with a hole therein operably positioned between said inlet and outlet passages: sealing means including a cup-shaped member of two distinct cylindrical portions of different diameters extending into said hole and having a flange for engaging said plate, a disc-shaped member having an upwardly extending recess in axial alignment with said cup-shaped member and having an annular flange forming a groove adjacent the inside wall of said container, a coil spring secured in said cup-shaped member and in said recess, an annular gasket seated in said groove forming a seal between said flange and the inside wall of said container, and a cover for said container arranged to exert an axial force against said disc-shaped member.

5. A filtering device as set forth in claim 4 in which said disc-shaped member is provided with lugs for holding said gasket in said groove.

References Cited in the file of this patent

UNITED STATES PATENTS

| Number | Name | Date |
|---|---|---|
| 2,568,181 | Zimmerman et al. | Feb. 18, 1951 |
| 2,584,551 | Chambers et al. | Feb. 5, 1952 |
| 2,671,564 | Fricke | Mar. 9, 1954 |